United States Patent [19]

Deguchi et al.

[11] Patent Number: 5,164,440
[45] Date of Patent: Nov. 17, 1992

[54] HIGH RIGIDITY AND IMPACT RESISTANCE RESIN COMPOSITION

[75] Inventors: Ryuichi Deguchi, Ube; Takeyoshi Nishio, Okazaki; Akane Okada, Nagoya, all of Japan

[73] Assignees: Ube Industries, Ltd., Ube; Toyota Jidosha Kabushiki Kaisha, Toyota; Kabushiki Kaisha Toyota Chuo Kenkyusho, Aichi, all of Japan

[21] Appl. No.: 379,426

[22] Filed: Jul. 13, 1989

[30] Foreign Application Priority Data

Jul. 20, 1988 [JP] Japan ............................... 63-179095
Dec. 19, 1988 [JP] Japan ............................... 63-318519

[51] Int. Cl.$^5$ ..................... C08K 3/34; C08L 77/00
[52] U.S. Cl. ................................ 524/444; 524/445; 524/447; 524/456; 524/504; 524/505; 524/508; 524/514; 524/538
[58] Field of Search ............... 524/544, 505, 504, 514, 524/444, 445, 447, 505, 508, 538, 456

[56] References Cited

U.S. PATENT DOCUMENTS

| | | | |
|---|---|---|---|
| 4,339,376 | 7/1982 | Kasahara et al. | 524/508 |
| 4,659,760 | 4/1987 | van der Meer | 524/505 |
| 4,739,007 | 4/1988 | Okada | 524/789 |
| 4,810,734 | 3/1989 | Kawasumi et al. | 524/789 |
| 4,822,837 | 4/1989 | van der Meer | 524/505 |
| 4,874,810 | 10/1989 | Lee, Jr. et al. | 524/505 |
| 4,889,885 | 12/1989 | Usuki et al. | 524/789 |

FOREIGN PATENT DOCUMENTS

| | | |
|---|---|---|
| 45-997 | 1/1970 | Japan . |
| 57-83551 | 5/1982 | Japan . |
| 63-10656 | 1/1983 | Japan . |
| 59-66452 | 4/1984 | Japan . |
| 59-41663 | 10/1984 | Japan . |
| 62-74957 | 4/1987 | Japan . |
| 62-250050 | 10/1987 | Japan . |

Primary Examiner—James J. Seidleck
Assistant Examiner—David Buttner
Attorney, Agent, or Firm—Frishauf, Holtz, Goodman & Woodward

[57] ABSTRACT

Disclosed is a polyamide resin composition comprising: (A) at least one of the group consisting of a polyamide resin and a resin composition containing a polyamide resin; (B) a layered silicate uniformly dispersed in the above component (A); and at least one selected from the group consisting of (C) an impact resistance improving material and (D) a polyphenylene ether type resin. The resin composition of this invention has excellent moldability, and the molded product of the resin composition has excellent heat resistance, rigidity and impact resistance.

22 Claims, No Drawings

HIGH RIGIDITY AND IMPACT RESISTANCE RESIN COMPOSITION

BACKGROUND OF THE INVENTION

1. Field of the Invention

This invention relates to a resin composition having excellent moldability, of which a resultant molded product has excellent heat resistance, rigidity and impact resistance.

2. Background Information

Polyamide resins have been widely utilized as molding materials for parts of automobiles or electrical parts, because their molded products have excellent mechanical properties.

However, when applied as the material for parts, etc. to be used under the conditions where excessive external force or heat is applied, they are not necessarily satisfactory with respect to rigidity, impact resistance and heat resistance under the present situation.

Also, there have been developed various resin compositions in which polyamides and polyphenylene ethers are combined. Generally speaking, polyamides are excellent in abrasion resistance, impact resistance, moldability, chemical resistance and mechanical strength, but involve problems in that rigidity may be lowered or dimensional change may occur during water absorption. On the other hand, polyphenylene ethers are excellent in heat resistance and water resistance, with dimensional change being also small, but involve problems in that moldability, chemical resistance and impact resistance are not sufficient.

Accordingly, for the purpose of making avail of mutual advantages and compensating for shortcomings by combining polyamides with polyphenylene ethers, various investigations have been made as described below.

The composition comprising a polyamide and a polyphenylene ether disclosed in Japanese patent publication Nos. 997/1970 and 41663/1984 is improved in flowability, but still insufficient in impact resistance.

The copolymer of a polyamide, a polyphenylene ether and a specific compound as represented by maleic anhydride prepared according to the method disclosed in Japanese patent publication No. 11966/1985, since it is prepared by adding the specific compound during melting and kneading of the polyamide and the polyphenylene ether, is improved somewhat in impact resistance, but not sufficiently, and heat resistance is still insufficient.

The composition comprising a polyamide and a modified polyphenylene ether disclosed in Japanese unexamined patent publication No. 66452/1984 is insufficient in both impact resistance and heat resistance.

The composition comprising a highly amino-rich polyamide, a polyphenylene ether and a specific compound as represented by maleic anhydride disclosed in Japanese unexamined patent pubication No. 250050/1987 is insufficient in impact resistance.

Japanese unexamined patent publication No. 10656/1988 discloses a commposition comprising an A-B-A' type block copolymer and a hydrogenated A-B-A' type block copolymer formulated as the impact resistance improving material into a modified polyphenylene ether and a polyamide. This composition is improved in impact resistance, but it is still insufficient.

As described above, in the resin composition containing a polyamide and a polyphenylene ether as the essential components of the prior art, there has been developed no composition which satisfies all the characteristics of heat resistance, impact resistance and rigidity. Particularly, when the case of using the above resin composition as the material for the outer plate of an automobile, etc. is considered, it is demanded that no deformation should occur even at high temperature during coating baking, and yet plane impact resistance under low temperature in cold districts should be high. Thus, it has been strongly desired to develop a material satisfying such characteristics.

SUMMARY OF THE INVENTION

A first object of the present invention is to improve insufficient features of the polyamide resin of the prior art and provide a polyamide resin composition of which a resultant molded product has excellent rigidity, impact resistance and heat resistance.

A second object of the present invention is to overcome the problems in the resin composition comprising a polyamide and a polyphenylene ether as the essential components and provide a resin composition from which a molded product having excellent heat resistance, rigidity and impact resistance, particularly, with little distortion during coating baking and yet have excellent plane impact resistance under low temperature.

The polyamide resin composition of the present invention comprises (A) at least one selected from the group consisting of a polyamide resin and a resin mixture containing a polyamide resin; (B) a layered silicate uniformly dispersed in the above component (A); and at least one selected from the group consisting of (C) an impact resistance improving material and (D) a polyphenylene ether type resin.

DESCRIPTION OF THE PREFERRED EMBODIMENTS

The component (A) constituting the composition of the present invention is a polyamide resin or a resin mixture containing a polyamide resin.

The polyamide resin has an acid amide bond (-CONH-) in the molecule, including specifically polymers or copolymers obtained from $\epsilon$-caprolactam, 6-aminocaproic acid, $\epsilon$-enantholactam, 7-aminoheptanoic acid, 11-aminoundecanoic acid, 9-aminononanoic acid, $\alpha$-pyrrolidone, $\alpha$-piperidone and the like; polymers or copolymers obtained by polycondensation of diamines such as hexamethylenediamine, nonamethylenediamine, undecamethylenediamine, dodecamethylenediamine, metaxylylenediamine, etc. with dicarboxylic acids such as terephthalic acid, isophthalic acid, adipic acid, sebacic acid, etc.; or blends of these.

The polyamide resin of the component (A) should be preferably one having an average molecular weight of 9,000 to 30,000.

Examples of other resins to be used when the component (A) is a mixture of a polyamide resin and other polymers may include polypropylene, ABS resin, polycarbonate, polyethyleneterephthalate, polybutyleneterephthalate, etc. When the component (A) is a mixture, the content of the polyamide resin should be preferably 80% by weight or more.

The component (B) is a layered or laminar silicate. The component (B) is a component which contributes to impart excellent mechanical properties and heat resistance to the molded product obtained from the polyamide resin composition.

Its shape may be preferably one having generally a thickness of 6 to 20Å and one side length within the range of 0.002 to 1 μm.

The layered silicate when dispersed in the component (A) is characterized by being uniformly dispersed with the respective dispersed layers maintaining interlayer distances of 20Å or more on an average. Here, the interlayer distance refers to the distance between the gravity centers of flat plates of the layered silicate, and uniform dispersion refers to the dispersed state in which each one sheet of the layered silicate or a multilayer of 5 layers or less on an average exists in parallel or randomly, or under the state where parallel and random states exist in mixture, with 50% or more, preferably 70% or more, thereof forming no local mass. Accordingly, the layered silicate should preferably be a substance having one side of 0.002 to 1 μm, and a thickness of 6 to 20Å.

As the starting material for such layered silicate, layered phyllosilicate minerals constituted of layers of magnesium silicate or aluminum silicate may be exemplified. Specifically, there can be included smectite type clay minerals such as montmorillonite, saponite, beidellite, nontronite, hectorite, stevensite, etc. and vermiculite, halloysite, etc., and these can be either natural or synthetic. Among these, montmorillonite is preferred.

The method for dispersing uniformly such layered silicate of the component (B) into a polyamide resin or a resin containing a polyamide is not particularly limited, but when the starting material for the layered silicate of the present invention is a multi-layer clay mineral, there may be employed the method in which the clay mineral is contacted with a swelling agent to expand previously the interlayer distances to have made the monomer readily incorporatable between the layers before mixing with the polyamide monomer and polymerization thereof (see U.S. Pat. No. 4,739,007).

Also, there may be employed the method in which the interlayer distance of the clay minerals is previously expanded to 50Å or more by use of a polymeric compound as the swelling agent, and the mineral thus modified is melted and kneaded with a polyamide resin or a resin containing this to be dispersed uniformly therein.

The formulation ratio of the component (B) may be preferably 0.05 to 30 parts by weight, more preferably 0.1 to 10 parts by weight per 100 parts by weight of the component (A). If the formulation ratio of the component (B) is less than 0.05 part by weight, improvements of rigidity, heat resistance and impact resistance of the molded product are undesirably small, while if it exceeds 30 parts by weight, the flowability of the resin composition will be extremely lowered and moldability will be lowered, whereby the composition may be sometimes undesirably unsuitable as the material for injection molding.

The component (C) is an impact resistance improving material. The component (C) is not particularly limited, provided that it can improve impact resistance of the molded product. As the component (C), for example, at least one selected from the respective impact resistance improving materials shown below can be used:

(1) impact resistance improving materials comprising copolymers obtained from ethylene, unsaturated carboxylic acid and unsaturated carboxylic acid metal salt;

(2) impact resistance improving materials comprising olefin copolymers containing 0.01 to 10 mole % of acid groups; and (3) impact resistance improving materials comprising block copolymers obtained from vinylaromatic compounds containing 0.01 to 10 mole % of acid groups and conjugated diene compounds or hydrogenated products of said block copolymers, etc.

In the copolymer constituting the impact resistance improving material of the above (1), the ratio of ethylene units in the copolymer is 90 to 98 mole %, with the balance comprising substantially unsaturated carboxylic acid units and unsaturated carboxylic acid metal salt units. If the ratio of ethylene units is too small, the material may be high in rigidity but undesirably low in impact resistance, while if it is too much, compatibility with the polyamide is worsened, there is no significant improvement of impact strength and layer peeling may undesirably sometimes occur.

Examples of the unsaturated carboxylic acid may include acrylic acid, methacrylic acid and ethacrylic acid, and the unsaturated carboxylic acid may be partially methyl ester, ethyl ester, propyl ester or butyl ester.

The metal salt of the unsaturated carboxylic acid may be a salt of the above unsaturated carboxylic acid with a metal of the group IA, IB, IIA, IIB, IIIA or the fourth period of the group VIII of the periodic table. Examples of such metals may include sodium, potassium, copper, magnesium, calcium, barium, zinc, cadmium, aluminum, iron, cobalt, nickel, etc. Among these, sodium, potassium, magnesium, calcium, barium and zinc are preferred.

Examples of the copolymer constituting the impact resistance improving material of the above (2) may include copolymers obtained from olefinic hydrocarbons such as ethylene, propylene, butylene, isobutylene, amylene, butene-1, hexene-1, decene-1 and 4-methylbutene-4-methylpentene-1 and the like.

The olefinic copolymer may also contain a constituent unit having an unsaturated bond. The above unit can be introduced by copolymerizing dicyclopentadiene, ethylidene norbornene, etc.

As the olefin copolymer, block or random copolymers containing 70 mole % or more of ethylene units and propylene units, with the molar ratio of the above ethylene units and propylene units being 1:2 to 6:1, having a melt flow rate (M.F.R.) at 2.16 kg/230° C. of 1 to 10 are preferred.

Such olefin copolymers contain 0.01 to 10 mole % of acid groups. If the content of acid groups is too small, compatibility with the polyamide is poor and impact resistance will not be significantly improved undesirably, while if it is too much, no further effect can be obtained for improvement of impact resistance at a certain level or higher and productivity will be worsened undesirably.

As the method for introducing acid groups into olefin copolymers, there can be applied the method in which a radical generating agent such as benzoylperoxide, t-butyl hydroperoxide, etc. and maleic acid or acrylic acid are allowed to react during copolymerization.

As the vinylaromatic compound which is the starting material for the copolymer constituting the impact resistance improving material of the above (3), there can be exemplified styrene, vinylxylene, vinylnaphthalene, α-methylstyrene and vinyltoluene. These can be used in a combination of two or more kinds.

As the conjugated diene compound which is similarly the starting material, there can be exemplified butadiene, isoprene, 1,3-pentadiene and 2,3-dimethylbutadiene. These can be used in a combination of two or more kinds.

Specifically, there may be included styrene-butadiene random copolymer, styrene-butadiene-styrene block copolymer, styrene-isoprene-styrene block copolymer, hydrogenated styrene-butadiene-styrene block copolymer, hydrogenated styrene-isoprene-styrene block copolymer and the like.

The copolymer of the above (3) should preferably be one having a block structure of the polymer (I) comprising vinyl aromatic compound units and the polymer (II) comprising conjugated diene compound units represented by the following formula: (I)-(II)-(I) (wherein (I)'s may be either the same or different). With the copolymer having such a constitution, improvement of impact resistance and good moldability can be maintained. Also, the polymer (II) may be partially hydrogenated.

The ratio of the above polymer (I) and the polymer (II) constituting the copolymer of the above (3) should be preferably one containing 60 mole % or more of the polymer (II). If the ratio of the polymer (II) is too small, no effect of improvement of impact resistance will be exhibited undesirably.

Such copolymer contains 0.01 to 10 mole % of acid groups. If the content of acid groups is outside of this range, it is not preferable for the same reason as mentioned in the above case (2).

As the method for introducing acid groups into the olefin copolymer, the same method as in the above (2) is applicable.

The formulation ratio of the component (C), when the resin composition of the present invention comprises the components (A), (B) and (C), may be preferably 5 to 70 parts by weight, more preferably 8 to 60 parts by weight, per 100 parts by weight of the component (A). If the formulation ratio of the component (C) is less than 5 parts by weight, improvement of impact resistance of the molded product is undesirably insufficient, while if it exceeds 70 parts by weight, rigidity (flexural modulus) and heat resistance will be gradually lowered undesirably.

When the resin composition of the present invention comprises the components (A), (B), (C) and (D), preferable formulation ratio of the component (C) may be not more than 35 parts by weight per 100 parts by weight of the total amount of the components (A) and (D). If it exceeds 35 parts by weight, moldability is lowered and heat resistance of the molded product is lowered undesirably.

The component (D) constituting the composition of the present invention is a polyphenylene ether type resin.

The polyphenylene ether resin should be preferably modified to be made compatible by incorporating a compound having a functional group reactive with polyamide (amino group, carboxyl group, epoxy group, etc.) internally into the molecule of the polyphenylene ether type resin, or graft polymerizing a modifier such as an unsaturated carboxylic acid or a derivative thereof or an unsaturated imide compound onto the polyphenylene ether type resin, or kneading at the same time an unsaturated carboxylic acid, etc. and a peroxide, etc. into the mixture during mixing with polyamide resin, etc.

The polyphenylene ether type resin can be prepared according to the methods as described in U.S. Pat. Nos. 3,306,874, 3,306,875, 3,257,357 and 3,257,358, and is a polymer represented by the following formula:

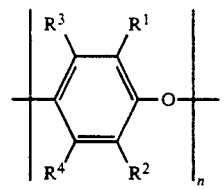

(wherein $R^1$, $R^2$, $R^3$ and $R^4$ represent a residual group such as hydrogen, a halogen, an alkyl group and an aryl group, which may be the same or different, and n represents a polymerization degree).

Examples of the polyphenylene ether type resin may include poly(2,6-dimethylphenylene-1,4-ether), poly(2,6-diethylphenylene-1,4-ether), poly(2,6-dibromophenylene-1,4-ether), poly(2-methyl-6-ethylphenylene-1,4-ether), poly(2-chloro-6-methylphenylene-1,4-ether), poly(2-methyl-6-isopropylphenylene-1,4-ether), poly(2,6-di-n-propylphenylene-1,4-ether), poly(2-chloro-6-bromophenylene-1,4-ether), poly(2-chloro-6-ethylphenylene-1,4-ether), poly(2-methylphenylene-1,4-ether), poly(2-chlorophenylene-1,4-ether), poly(2-methyl-6-phenylphenylene-1,4-ether), poly(2-bromo-6-phenylphenylene-1,4-ether), poly(2,4'-methylphenylphenylene-1,4-ether) and poly(2,3,6-trimethylphenylene-1,4-ether), copolymers of these and copolymers having styrenic compounds graft copolymerized onto these.

Examples of the unsaturated carboxylic acid or derivatives thereof to be used as the modifier may include monocarboxylic acids such as acrylic acid, methacrylic acid, etc., dicarboxylic acids such as maleic acid, itaconic acid, fumaric acid, etc. or anhydrides thereof. Among these, the above dicarboxylic acids or anhydrides thereof are preferred, particularly maleic anhydride.

Examples of the unsaturated imide compound to be used as the modifier may include maleimide, N-methylmaleimide, N-ethylmaleimide, N-propylmaleimide, N-butylmaleimide, N-octylmaleimide, N-phenylmaleimide, N-(o-methylphenyl)maleimide, N-(m-methylphenyl)maleimide, N-(p-methylphenyl)maleimide, N-(methoxyphenyl)maleimide, N-(chlorophenyl)maleimide, N-(carboxyphenyl)maleimide, N-benzylmaleimide, N-naphthylmaleimide, N-cyclohexylmaleimide, itaconimide, N-methylitaconimide, N-phenylitaconimide and the like. Among these, N-cyclohexylmaleimide, N-benzylmaleimide, N-phenylmaleimide, N-(carboxyphenyl)maleimide are preferred.

These unsaturated carboxylic acids or derivatives thereof or unsaturated imide compounds can be used as a single kind, or two or more kinds can be used.

The amount of the modifier such as unsaturated carboxylic acid, etc. used for modifying the polyphenylene ether type resin may be 0.01 to 10% by weight based on the above polyphenylene ether type resin, preferably 0.1 to 5% by weight. If the amount used is less than 0.01% by weight, the composition is lowered in compatibility, whereby impact resistance, heat resistance of the molded product is undesirably lowered. If it exceeds 10% by weight, the composition is lowered in flowability, whereby moldability is undesirably impaired.

Preparation of the modified polyphenylene ether type resin by heating and melting a polyphenylene ether type resin and an unsaturated carboxylic acid, etc. in the presence of a peroxide at a temperature of 250° to 350° C. is also another method.

Examples of the peroxide to be used in this case may include benzoylperoxide, α, α-bis-t-butylperoxy-p-diisopropylbenzene, etc.

The ratios of the formulation amounts of the components (A) and (D) may be 10 to 90% by weight of the component (A) and 90 to 10% by weight of the component (D). If the formulation amount of the component (A) is less than 10% by weight, the moldability of the composition is lowered, while if it exceeds 90% by weight, heat resistance of the molded product is lowered.

The formulation amounts of the components (A) and (D) may be preferably 30 to 80% by weight of the component (A) and 70 to 20% by weight of the component (D).

When the resin composition of the present invention contains the component (D), the component (B) permits the polyphenylene ether type resin of the component (D) to be finely dispersed into the polyamide resin of the component (A) which becomes the matrix in the molded product obtained from the resin composition, and also contributes to impart excellent mechanical properties, heat resistance and plane impact resistance to the molded product.

In the composition of the present invention, if necessary, there can be formulated fillers or moldability improving agents such as dyes, pigments, nucleating agents, mold release agents, etc., fibrous reinforcing materials such as glass fibers, metal fibers, carbon fibers, etc., granular reinforcing materials, plasticizers, lubricants, heat resistance imparting agents or improving agents, foaming agents, flame retardants, etc.

The method for preparing the resin composition of the present invention is not particularly limited, provided that it can disperse uniformly the respective constituent components. For example, when the starting material for the silicate of the component (B) is a multilayer clay mineral, there can be applied the method in which the components (A) and (B) are mixed according to the method comprising bringing the mineral into contact with a swelling agent to expand previously the interlayer distances to make the monomer readily incorporatable between the layers before mixing with the monomer for forming the component (A) followed by polymerization (see U.S. Pat. No. 4,739,007), and further the impact resistance improving material of the component (C) is formulated, the method in which the component (C) is formulated by kneading into the melted and kneaded product of the components (A) and (B), or the method in which the component (C) is formulated into a molded product in shape of powder or pellets comprising the components (A) and (B), and then the mixture is melted and kneaded.

Further, there can be applied the method in which the layered silicate of the component (B) is brought into contact with a swelling agent to expand previously the interlayer distances to make the monomer readily incorporatable between the layers before mixing with the monomer for forming the component A followed by polymerization (see U.S. Pat. No. 4,739,007), and further the polyphenylene ether resin of the component (D) is mixed and melted and kneaded at 230° to 350° C., preferably 250° to 320° C., and the method in which into the polyamide under a molten state after completion of polymerization, kneaded and formulated are the molten polyphenylene ether type resin of the component (D) and the layered silicate of the component (B) with previously expanded interlayer distance of 20Å or more, etc.

In the resin composition of the present invention, it is preferable that the polyamide resin of the component (A) should form the continuous phase in the composition and the polyphenylene ether type resin of the component (D) should form the dispersed phase as the particles with a number average particle size of 2 μm or less. The layered silicate of the component (B) may exist either in both phases of the component (A) and the component (D), or in only one phase of them.

At present, there have been made various proposals of the inventions in which impact resistance improving materials are combined for improvement of impact resistance of polyamide resins. However, compositions exhibiting excellent impact resistance at low temperature had the drawback that rigidity and heat resistance are lowered. One of the embodiments of the present invention has alleviated this drawback by combining an impact resistance improving material with the composition having a layered silicate uniformly dispersed in a polyamide resin or a resin containing the same. The reason is not clear, but it may be considered that uniform dispersion of a layered silicate has resulted in improvement of rigidity, heat resistance without impairing impact resistance.

The other embodiment of the present invention can improve both heat resistance and impact resistance of the molded product at the same time by further formulating a layered silicate into a mixture of a polyamide resin and a polyphenylene ether resin. Ordinarily, when an inorganic filler is formulated into a mixture of a polyamide resin and a polyphenylene ether type resin, rigidity and heat resistance can be improved, but on the other hand, impact resistance is lowered. However, in the composition of the present invention, the layered silicate exists as dispersed in a very fine state, and by formulation thereof in a small amount, rigidity and heat resistance can be improved and yet dispersion mutually between the polymers can be also effected finely with small particle sizes in the domain, whereby impact resistance may be considered to be improved along with rigidity and heat resistance.

The resin composition of the present invention can be utilized for various parts of automobiles, electronic and electrical parts, mechanical parts, preparation materials and for miscellaneous goods in general.

The present invention is described in more detail by referring to Examples, parts indicate parts by weight.

EXAMPLE 1

One hundred (100) g of montmorillonite which is the starting material with an average thickness of 9.5Å and one side length of about 0.1 μm of one unit of layered silicate was dispersed in 10 liters of water, and to the resultant dispersion, added were 51.2 g of 12-aminododecanoic acid and 24 ml of conc. hydrochloric acid and the mixture was stirred for 5 minutes, followed by filtration. The product was thoroughly washed and then vacuum dried. By this operation, a composite of 12-aminododecanoic acid ammonium ions and montmorillonite was prepared. The layered silicate content in the composite was about 80%.

Next, into a reactor equipped with a stirrer, charged were 10 kg of ε-caprolactam, 1 kg of water and 100 g of the above composite, and the mixture was stirred so that the reaction system became an internally uniform state at 100° C. Further, the temperature was elevated to 260° C., and the mixture was stirred under pressurization of 15 kg/cm² for one hour. Then, the pressure was liberated, and while permitting the water content to be evaporated from the reaction vessel, the reaction was carried out under normal pressure at 260° C. for 3 hours. After completion of the reaction, the reaction product taken out in a strand from the nozzle at the lower part of the reactor was cooled with water and subjected to cutting to obtain pellets comprising a polyamide resin (average molecular weight 15,000) and montmorillonite. The pellets were dipped in hot water to extract and remove about 10% of unreacted monomer, followed by drying in vacuum.

Next, an impact resistance improving material comprising a copolymer constituted of 95 mole % of ethylene units, 2 mole % of methacrylic acid units, 2 mole % of zinc methacrylate units and 1 mole % of methyl methacrylate units (impact resistance improving material (a)) was prepared using corresponding monomers by means of a high pressure method polyethylene producing device and a saponifying device.

Then, the above pellets and the impact resistance improving material (a) were blended by a blender at a weight ratio of 65:35 for 30 minutes. Next, the above mixture was kneaded through a twin screw kneading extruder TEX 30 (manufactured by Nippon Seikosho K.K.) under the conditions of setting temperatures of the extruder $C_1$:250° C., $C_2$:270° C., $C_3$:270° C., and a die temperature: 270° C., to obtain a composition of the present invention.

The composition thus obtained was injection molded under the conditions shown below to prepare a test strip, and various tests as described below were conducted by use of this test strip. The results are shown in Table 1. The formulation amounts of the respective constituent components in Table 1 are shown as calculated in parts by weight of the practical formulation amounts. This is the same in the following description.

Injection molding machine:
  IS-80, manufactured by Toshiba Kikai K.K.
Cylinder setting temperatures:
  $C_1$ 240° C.; $C_2$ 260° C.; $C_3$ 270° C.; $C_4$ (nozzle) 270° C.
Injection pressure: 600 kg/cm²
Mold temperature: 88° C.
Injection time: 10 sec.
Cooling time: 20 sec.

MEASUREMENT TESTS

Tensile yielding point strength: ASTM-D-638
Elongation at break point: ASTM-D-638
Flexural modulus: ASTM-D-790
  (All the above three tests were conducted under absolutely dry state at 23° C.)
Impact resistance: ASTM-D-256
  (conducted under absolutely dry state at −30° C.)
Heat distortion temperature (ASTM-D-648)
  (tested under absolutely dry state)

EXAMPLES 2 and 3

In the same manner as in Example 1 except for changing the amount of the montmorillonite composite charged into the reactor in Example 1 to 200 g (Example 2) or 400 g (Example 3), compositions were obtained.

By use of these compositions, the respective tests were conducted. The results are shown in Table 1.

COMPARATIVE EXAMPLE 1

In Example 1, no composite was charged into the reactor but only 10 kg of ε-caprolactam and 1 kg of water were charged, and following otherwise the same procedure as in Example 1, pellets were prepared. Further, the respective tests were conducted in the same manner as in Example 1 except for formulating no impact resistance improving material (a). The results are shown in Table 1.

COMPARATIVE EXAMPLE 2

In Example 2, no composite was charged into the reactor, but only 10 kg of ε-caprolactam and 1 kg of water were charged, and following otherwise the same procedure as in Example 2, the respective tests were conducted in the same manner as in Example 2. The results are shown in Table 1.

EXAMPLE 4

In Example 2, except for using, in place of the impact resistance improving material (a), an impact resistance improving material (b) obtained by adding 0.7 part by weight of maleic anhydride and 0.2 part by weight of benzoylperoxide to 100 parts by weight of a random copolymer comprising 47:53 molar ratio of ethylene units and propylene units with a M.F.R (2.16 kg/230° C.) of 3 g/min., followed by melting reaction, and changing the blending ratio during kneading to polyamide silicate composite: impact resistance improving material (b)=80:20, a composition was obtained in the same manner as in Example 2.

By use of this composition, the respective tests were conducted in the same manner as in Example 1. The results are shown in Table 1.

COMPARATIVE EXAMPLE 3

In Example 4, no composite was charged into the reactor but only 10 kg of ε-caprolactam and 1 kg of water were charged, and following otherwise the same procedure as in Example 4, the respective tests were conducted in the same manner as in Example 4. The results are shown in Table 1.

EXAMPLE 5

In Example 4, except for using, in place of the impact resistance improving material (b), a partially hydrogenated block copolymer comprising polystyrene-polybutadiene-polystyrene (molar ratio 10:80:10) with a M.F.R (2.16 kg/230° C.) of 3.4 g/10 min. which was modified with 0.05 mole % maleic acid according to the same method as in Example 4 (an impact resistance improving material (c)), a composition was obtained in the same manner as in Example 4.

By use of this composition, the respective tests were conducted in the same manner as in Example 1. The results are shown in Table 1.

COMPARATIVE EXAMPLE 4

In Example 5, no composite was charged into the reactor but only 10 kg of ε-caprolactam and 1 kg of water were charged, and following otherwise the same procedure as in Example 5, the respective tests were conducted in the same manner as in Example 5. The results are shown in Table 1.

As is apparent from the Table, it can be understood that the products of Comparative examples are lowered in characteristics in any of measurement test results such as tensile test, etc., while in Examples of the present invention, no lowering is observed in all the characteristics, thus exhibiting overall excellent characteristics.

ite. The pellets were dipped in hot water to extract and remove the unreacted monomer (about 10%), followed by drying in vacuum. The ratios of the polyamide and montmorillonite in the dry pellets were 100 parts by weight of the polyamide resin and 1.7 parts of montmorillonite.

Next, one part by weight of maleic anhydride per 100

TABLE 1

|  |  | Exa. 1 | Exa. 2 | Exa. 3 | Comp. Exa. 1 | Comp. Exa. 2 | Exa. 4 | Comp. Exa. 3 | Exa. 5 | Comp. Exa. 4 |
|---|---|---|---|---|---|---|---|---|---|---|
| Polyamide resin (average molecular weight = 15,000) |  | 100 | 100 | 100 | 100 | 100 | 100 | 100 | 100 | 100 |
| Laminar silicate | Kind of starting-material | Montmorillonite | Montmorillonite | Montmorillonite | — | — | Montmorillonite | — | Montmorillonite | — |
|  | Formulation measured amount (parts) | 0.9 | 1.7 | 3.3 | — | — | 1.7 | — | 1.7 | — |
| Impact resistance improving material | Kind | (a) | (a) | (a) | — | (a) | (b) | (b) | (c) | (c) |
|  | Formulation measured amount (parts) | 54 | 53 | 53 | — | 54 | 25 | 25 | 25 | 25 |
| Tensile strength (kg/cm$^2$) |  | 600 | 630 | 650 | 730 | 360 | 510 | 410 | 560 | 480 |
| Elongation (%) |  | more than 200 | more than 200 | 100 | 100 | more than 200 | 100 | 80 | 90 | 130 |
| Flexural modulus (kg/cm$^2$) |  | 17,000 | 19,000 | 22,000 | 26,000 | 13,000 | 19,300 | 15,500 | 21,000 | 16,000 |
| Impact resistance (Izod, notched, −30° C., kg · cm/cm) |  | 17 | 19 | 22 | 4 | 20 | 40 | 41 | 14 | 16 |
| Heat distortion temperature (load 4.6 kg/cm$^2$, °C.) |  | 172 | 172 | 174 | 175 | 135 | 176 | 156 | 182 | 147 |

As is apparent from the above experiments, the molded product obtained from the composition of the present invention has excellent rigidity (tensile strength and flexural modulus), impact resistance and heat resistance.

EXAMPLE 6

Two hundred (200) g of montmorillonite which is the starting material with an average thickness of 9.5Å and one side length of about 0.1 μm of one unit of layered silicate was dispersed in 10 liters of water, and, to the resultant dispersion, added were 51.2 g of 12-aminododecanoic acid and 24 ml of conc. hydrochloric acid and the mixture was stirred for 5 minutes, followed by filtration. Further, the product was thoroughly washed and then vacuum dried. By this operation, a complex of 12-aminododecanoic acid ammonium ions and montmorillonite was prepared. The layered silicate content in the composite was about 80% by weight. The silicate interlayer distance in this composite as measured by X-ray diffraction was found to be 18.0Å.

Next, into a reactor equipped with a stirrer, charged were 10 kg of ε-caprolactam, 1 kg of water and 200 g of the above composite having been dried, and the mixture was stirred so that the reaction system became internally uniform state at 100° C. Further, the temperature was elevated to 260° C., and the mixture was stirred under pressurization of 15 kg/cm$^2$ for one hour. Then, the pressure was liberated, and while permitting water to be evaporated from the reaction vessel, the reaction was carried out under normal pressure for 3 hours. After completion of the reaction, the reaction product taken out in a strand from the nozzle at the lower part of the reactor was cooled with water and subjected to cutting to obtain pellets comprising a polyamide resin (average molecular weight 15,000) and montmorillonparts by weight of a poly(2,6-dimethyl-1,4-phenylene)ether with an inherent viscosity of 0.48 (25° C., in chloroform) and 20 parts by weight of benzoylperoxide per 100 parts by weight of maleic anhydride were kneaded at 300° C. by means of an extruder to obtain pellets of a modified polyphenylene ether resin.

Then the above pellets and the modified polyphenylene ether resin were mixed with the formulation ratio of 70 parts by weight of the polyamide resin and 30 parts by weight of the polyphenylene ether resin. Next, further, the mixture was melted and kneaded at 290° C. by use of a twin screw extruder with a screw diameter of 30 mm to obtain the pellets of a resin composition of the present invention.

The pellets of the resin composition obtained were dried under reduced pressure and injection molded under the conditions shown below to prepare test strips, and then the respective evaluation tests of various characteristics shown in Table 2 were conducted. The interlayer distance of the layered silicate in the test strip was found to be 100Å A or more as the result of X-ray diffraction. The interlayer distance was the same also for the following Examples 7 to 14.

The test methods of the respective characteristics shown below are as follows.

Tensile strength: ASTM D-638
Flexural strength, Flexural modulus: ASTM D-790
Izod impact strength: ASTM D-256
Heat distortion temperature: ASTM D-648
High speed impact strength: According to the plane impact measuring method (the UBE method), first, the pellets of the resin composition of the present invention are molded into a disc with a thickness of 3.2 mm and a diameter of 100 mm, and the disc was used as the test strip. Next, at −30° C., a round missile with a tip end diameter of ½ inch was dropped at a speed of 2.5 m/sec onto the center of the above test strip, and from the stress-strain curve during breaking in that case, the breaking energy was calculated.

Dispersed particles size of polyphenylene ether type resin: After the polyphenylene ether type resin was dissolved in chloroform at 61° C., SEM enlarged photograph was photographed, and the size was determined from the photograph.

INJECTION MOLDING CONDITIONS

Injection molding machine:
IS-80, manufactured by Toshiba Kikai K.K.
Cylinder setting temperatures:
$C_1$ 240° C.; $C_2$ 265° C.; $C_3$ 285° C.; $C_4$ (nozzle) 285° C.
Injection pressure: 600 kg/cm$^2$
Mold temperature: 80° C.
Injection time: 10 sec.
Cooling time: 20 sec.

EXAMPLE 7

In Example 6, except for changing the formulation ratios to 60 parts of the polyamide resin, 40 parts of the modified polyphenylene ether resin and 1.0 part of montmorillonite, a resin composition was obtained in the same manner as in Example 6. By use of this composition, respective evaluation tests were conducted in the same manner as in Example 6. The results are shown in Table 2.

EXAMPLE 8

In Example 6, except for changing the formulation ratios to 50 parts of the polyamide resin, 50 parts of the modified polyphenylene ether resin and 0.8 part of montmorillonite, a resin composition was obtained in the same manner as in Example 6. By use of this composition, respective evaluation tests were conducted in the same manner as in Example 6. The results are shown in Table 2.

COMPARATIVE EXAMPLE 5

In Example 6, except for carrying out polymerization without use of the composite of montmorillonite and the polyamide resin, and melting and kneading only the polyamide resin and the modified polyphenylene ether resin with formulation ratios shown in Table 2, a resin composition for comparison was obtained in the same manner as in Example 6. By use of this composition, various evaluation tests were conducted in the same manner as in Example 6. The results are shown in Table 2.

COMPARATIVE EXAMPLE 6

In Example 7, except for carrying out polymerization without use of the composite of montmorillonite and the polyamide resin, and melting and kneading only the polyamide resin and the modified polyphenylene ether resin with formulation ratios shown in Table 2, a resin composition for comparison was obtained in the same manner as in Example 7. By use of this composition, various evaluation tests were conducted in the same manner as in Example 7. The results are shown in Table 2.

COMPARATIVE EXAMPLE 7

In Example 8, except for carrying out polymerization without use of the composite of montmorillonite and the polyamide resin and melting and kneading only the polyamide resin and the modified polyphenylene ether resin with formulation ratios shown in Table 2, a resin composition for comparison was obtained in the same manner as in Example 8. By use of this composition, various evaluation tests were conducted in the same manner as in Example 8. The results are shown in Table 2.

EXAMPLE 9

In Example 6, during melting and kneading of the composite of montmorillonite and the polyamide resin with the modified polyphenylene ether resin, except for further melting and kneading a hydrogenated product of styrene-butylene-styrene copolymer manufactured by Shell Chemical Co. (hereinafter abbreviated as "SEBS") which is an impact resistance improving material with the formulation ratio of 70 parts of the polyamide resin, 30 parts of the modified polyphenylene ether resin, 1.1 part of the montmorillonite and 10 parts of SEBS, a resin composition of the present invention was obtained in the same manner as in Example 6. By use of this composition, the respective evaluation tests were conducted in the same manner as in Example 6. The results are shown in Table 2.

EXAMPLE 10

In Example 9, except for changing the amount of the montmorillonite composite charged into the reactor to 100 g, and further carrying out melting and kneading with the formulation ratio of 60 parts of the polyamide resin, 40 parts of the modified polyphenylene ether resin, 0.5 part of the montmorillonite and 10 parts of SEBS, a resin composition of the present invention was obtained in the same manner as in Example 9. By use of this composition, the respective evaluation tests were conducted in the same manner as in Example 9. The results are shown in Table 2.

EXAMPLE 11

In Example 9, except for carrying out melting and kneading with the formulation ratio of 60 parts of the polyamide resin, 40 parts of the modified polyphenylene ether resin, 1.0 part of the montmorillonite and 10 parts of SEBS, a resin composition of the present invention was obtained in the same manner as in Example 9. By use of this composition, the respective evaluation tests were conducted in the same manner as in Example 9. The results are shown in Table 2.

EXAMPLE 12

In Example 11, except for changing the amount of the montmorillonite composite charged into the reactor to 300 g, and further carrying out melting and kneading with the formulation ratio of 60 parts of the polyamide resin, 40 part of the modified polyphenylene ether resin, 1.5 part of the montmorillonite and 10 parts of SEBS, a resin composition of the present invention was obtained in the same manner as in Example 11. By use of this composition, the respective evaluation tests were conducted in the same manner as in Example 11. The results are shown in Table 2.

EXAMPLE 13

In Example 9, except for carrying out melting and kneading with the formulation ratio of 50 parts of the polyamide resin, 50 parts of the modified polyphenylene ether resin, 0.8 part of the montmorillonite and 10 parts of SEBS, a resin composition of the present invention was obtained in the same manner as in Example 9. By use of this composition, the respective evaluation tests were conducted in the same manner as in Example 9. The results are shown in Table 2.

EXAMPLE 14

In Example 9, except for carrying out melting and kneading with the formulation ratio of 40 parts of the polyamide resin, 60 parts of the modified polyphenylene ether resin, 0.6 part of the montmorillonite and 10 parts of SEBS, a resin composition of the present invention was obtained in the same manner as in Example 9. By use of this composition, the respective evaluation tests were conducted in the same manner as in Example 9. The results are shown in Table 2.

COMPARATIVE EXAMPLE 8

In Example 9, except for carrying out polymerization without use of the composite of montmorillonite and the polyamide resin, and melting and kneading only the polyamide resin, the modified polyphenylene ether resin and SEBS with formulation ratios shown in Table 2, a resin composition for comparison was obtained in the same manner as in Example 9. By use of this composition, various evaluation tests were conducted in the same manner as in Example 9. The results are shown in Table 2.

COMPARATIVE EXAMPLE 9

In Example 11, except for carrying out polymerization without use of the composite of montmorillonite and the polyamide resin, and melting and kneading only the polyamide resin, the modified polyphenylene ether resin and SEBS with formulation ratios shown in Table 2, a resin composition for comparison was obtained in the same manner as in Example 11. By use of this composition, various evaluation tests were conducted in the same manner as in Example 11. The results are shown in Table 2.

COMPARATIVE EXAMPLE 10

In Example 13, except for carrying out polymerization without use of the composite of montmorillonite and the polyamide resin, and melting and kneading only the polyamide resin, the modified polyphenylene ether resin and SEBS with formulation ratios shown in Table 2, a resin composition for comparison was obtained in the same manner as in Example 13. By use of this composition, various evaluation tests were conducted in the same manner as in Example 13. The results are shown in Table 2.

COMPARATIVE EXAMPLE 11

In Example 14, except for carrying out polymerization without use of the composite of montmorillonite and the polyamide resin, and melting and kneading only the polyamide resin, the modified polyphenylene ether resin and SEBS with formulation ratios shown in Table 2, a resin composition for comparison was obtained in the same manner as in Example 14. By use of this composition, various evaluation tests were conducted in the same manner as in Example 14. The results are shown in Table 2.

TABLE 2

|  | Example | | | Comparative example | | | Example | |
| --- | --- | --- | --- | --- | --- | --- | --- | --- |
|  | 6 | 7 | 8 | 5 | 6 | 7 | 9 | 10 |
| Polyamide resin | 70 | 60 | 50 | 70 | 60 | 50 | 70 | 60 |
| Polyphenylene ether resin | 30 | 40 | 50 | 30 | 40 | 50 | 30 | 40 |
| Montmorillonite | 1.1 | 1.0 | 0.8 | — | — | — | 1.1 | 0.5 |
| SEBS | — | — | — | — | — | — | 10 | 10 |
| Tensile strength (kg/cm$^2$) | 820 | 800 | 790 | 720 | 700 | 700 | 600 | 590 |
| Flexural strength (kg/cm$^2$) | 27,600 | 27,700 | 28,200 | 24,200 | 23,900 | 24,700 | 23,000 | 21,900 |
| Izod impact strength 23° C. (notched) (kg · cm/cm) | 8.2 | 8.9 | 8.9 | 6.4 | 6.0 | 5.5 | 17 | 30 |
| −30° C. | 7.6 | 8.8 | 8.8 | 5.0 | 5.1 | 4.8 | 9 | 14 |
| High speed impact strength (−30° C.) (kg · cm) | — | — | — | — | — | — | — | — |
| Heat distortion temperature (18.6 kg/cm$^2$) (°C.) | 150 | 158 | 161 | 106 | 110 | 113 | 112 | 128 |
| Number average particle size (μm) | 1.2 | 0.9 | 0.9 | 1.6 | 1.6 | 1.5 | 0.49 | 0.28 |

|  | Example | | | | Comparative example | | | |
| --- | --- | --- | --- | --- | --- | --- | --- | --- |
|  | 11 | 12 | 13 | 14 | 8 | 9 | 10 | 11 |
| Polyamide resin | 60 | 60 | 50 | 40 | 70 | 60 | 50 | 40 |
| Polyphenylene ether resin | 40 | 40 | 50 | 60 | 30 | 40 | 50 | 60 |
| Montmorillonite | 1.0 | 1.5 | 0.8 | 0.6 | — | — | — | — |
| SEBS | 10 | 10 | 10 | 10 | 10 | 10 | 10 | 10 |
| Tensile strength (kg/cm$^2$) | 610 | 650 | 610 | 590 | 580 | 550 | 570 | 590 |
| Flexural strength (kg/cm$^2$) | 22,600 | 24,200 | 22,900 | 21,800 | 20,200 | 19,700 | 18,500 | 19,800 |
| Izod impact strength 23° C. (notched) (kg · cm/cm) | 36 | 28 | 76 | 88 | 14 | 22 | 60 | 74 |
| −30° C. | 14 | 13 | 23 | 24 | 7 | 11 | 20 | 22 |
| High speed impact strength (−30° C.) (kg · cm) | 870 | — | 570 | 500 | — | 360 | 390 | 300 |
| Heat distortion temperature (18.6 kg/cm$^2$) (°C.) | 139 | 144 | 140 | 148 | 98 | 107 | 122 | 139 |
| Number average particle size (μm) | 0.23 | 0.19 | 0.12 | 0.11 | 0.71 | 0.39 | 0.30 | 0.28 |

EXAMPLE 15

In Example 11, except for using a modified EPR (EXXELOR VA 1803, manufactured by Exxon Chemical Co.) in place of SEBS, the respective evaluation tests were conducted in the same manner as in Example 11. The results are shown in Table 3.

EXAMPLE 16

In Example 13, except for using a modified EPR in place of SEBS, the respective evaluation tests were conducted in the same manner as in Example 13. The results are shown in Table 3.

EXAMPLE 17

In Example 14, except for using a modified EPR in place of SEBS, the respective evaluation tests were conducted in the same manner as in Example 14. The results are shown in Table 3.

COMPARATIVE EXAMPLE 12

In Example 16, except for carrying out polymerization without use of the composite of montmorillonite and the polyamide resin, and melting and kneading only the polyamide resin, the modified polyphenylene ether resin and the modified EPR with formulation ratios shown in Table 3, a resin composition for comparison was obtained in the same manner as in Example 16. By use of this composition, various evaluation tests were conducted in the same manner as in Example 16. The results are shown in Table 3.

TABLE 3

|  | Example 15 | Example 16 | Example 17 | Compa. 12 |
| --- | --- | --- | --- | --- |
| Polyamide resin | 60 | 50 | 40 | 50 |
| Polyphenylene ether resin | 40 | 50 | 60 | 50 |
| Montmorillonite | 1.1 | 1.0 | 0.8 | — |
| Modified EPR | 10 | 10 | 10 | 10 |
| Tensile strength (kg/cm$^2$) | 570 | 570 | 570 | 530 |
| Flexural strength (kg/cm$^2$) | 21,000 | 21,700 | 20,600 | 19,300 |
| Izod impact at 23° C. | 80 | 80 | 73 | 78 |
| strength at −30° C. (notched) (kg · cm/cm) | 33 | 70 | 55 | 43 |
| High speed impact strength (at −30° C.) (kg/cm) | — | — | — | — |
| Heat distortion temperature (18.6 kg/cm$^2$) (°C.) | 118 | 126 | 136 | 102 |
| Number average particle size (μm) | 0.09 | 0.08 | 0.07 | 0.15 |

As is apparent from the above experiments, the molded product of the polyamide resin composition of the present invention has excellent rigidity, heat resistance and impact resistance.

We claim:

1. A polyamide resin composition comprising
   (A) at least one polyamide resin component selected from the group consisting of
      a polyamide resin and
      a resin composition comprising
         (i) at least 80 weight % of a polyamide resin and
         (ii) the remainder being another thermoplastic resin selected from the group consisting of polypropylene, an ABS resin, polycarbonate, polyethyleneterephthalate and polybutyleneterephthalate;
   (B) a layered silicate having a thickness of 6 to 20Å, a length of one side of 0.002 to 1 μm and being uniformly dispersed in the component (A) with a weight ratio of 0.05 to 30 parts by weight of (B) per 100 parts by weight of (A); and respective layers of silicate being positioned apart from each other by 20Å or more on an average; and
   (C) an impact resistance improving material selected from the group consisting of:
      impact resistance improving materials comprising copolymers obtained from ethylene, unsaturated carboxylic acid and unsaturated carboxylic acid metal salt;
      impact resistance improving materials comprising olefin copolymers containing 0.01 to 10 mole % of acid groups; and
      impact resistance improving materials comprising block copolymers, containing 0.01 to 10 mole % of acid groups, obtained from vinyl aromatic compounds and conjugated diene compounds, hydrogenated products of said block copolymers or mixtures thereof,
   wherein there are 5 to 70 parts by weight (c) per 100 parts by weight of (A).

2. The polyamide resin composition according to claim 1, wherein said polyamide resin is selected from the group consisting of
   polymers and copolymers obtained from ε-caprolactam, 6-aminocaproic acid, ε-enantholactam, 7-aminoheptanoic acid, 11-aminoundecanoic acid, 9-aminononoanoic acid, α-pyrrolidone, α-pyrrolidone or α-piperidone;
   polymers and copolymers obtained by polycondensation of a diamine selected from the group consisting of hexamethylenediamine, nonamethylenediamine, undecamethylenediamine, dodecamethylenediamine and metaxylylenediamine with an acid selected from the group consisting of terephthalic acid, isophthalic acid, adipic acid and sebacic acid; and
   blends thereof.

3. The polyamide resin composition according to claim 1, wherein said polyamide resin has an average molecular weight of 9,000 to 30,000.

4. The polyamide resin composition according to claim 1, wherein said layered silicate comprises a layered phyllosilicate mineral which comprises layers of magnesium silicate or aluminum silicate.

5. The polyamide resin composition according to claim 1, wherein said layered silicate is at least one selected from the group consisting of montmorillonite, saponite, beidellite, nontronite, hectorite, stevensite, vermiculite and halloysite.

6. The polyamide resin composition according to claim 1, wherein the formulation ratio of the component (B) is 0.1 to 10 parts by weight per 100 parts by weight of the component (A).

7. The polyamide resin composition according to claim 1, wherein the formulation ratio of the component (C) is 8 to 60 parts by weight per 100 parts by weight of the component (A).

8. The polyamide resin composition according to claim 1, wherein said layered silicate comprises montmorillonite.

9. The polyamide resin composition according to claim 1, wherein said impact resistance improving material comprises a copolymer obtained from ethylene, unsaturated carboxylic acid and unsaturated carboxylic acid metal salt and wherein ethylene units in the copolymer comprise 90 to 98 mole % with the balance comprising unsaturated carboxylic acid units and unsaturated carboxylic metal salt units, said unsaturated carboxylic acid is selected from the group consisting of acrylic acid, methacrylic acid and ethacrylic acid, said metal salt of the unsaturated carboxylic acid is a salt of an acid selected from the group consisting of acrylic acid, methacrylic acid and ethacrylic acid and a metal selected from the group consisting of sodium, potassium, copper, magnesium, calcium, barium, zinc, cadmium, aluminum, iron, cobalt and nickel.

10. The polyamide resin composition according to claim 1, wherein said impact resistance improving material comprises an olefin copolymer and said olefin copolymer contains 0.01 to 1 mole % of acid groups and is obtained from an olefinic hydrocarbon selected from the group consisting of ethylene, propylene, butylene, isobutylene, amylene, butene-1, hexene-1, decene-1 and 4-methylbutene-4-methylpentene-1.

11. The polyamide resin composition according to claim 1, wherein said impact resistance improving material comprises an olefin copolymer and said olefin copolymer contains 0.01 to 1 mole % of acid groups and comprises a constituent unit having an unsaturated bond, said constituent unit being introduced by copolymerizing a moiety selected from the group consisting of dicyclopentadiene, ethylidene and norbornene.

12. The polyamide resin composition according to claim 1, wherein said impact resistance improving material comprises an olefin copolymer and said olefin copolymer contains 0.01 to 1 mole % of acid groups and comprises a block or random copolymer comprising 70 mole % or more of ethylene units and propylene units, with a molar ratio of ethylene units to propylene units being 1:2 to 6:1, and having a melt flow rate at 2.16 kg/230° C. of 1 to 10.

13. The polyamide resin composition according to claim 1, wherein said impact resistance improving material comprises a block copolymer which contains 0.01 to 1 mole % of acid groups and is obtained from a vinylaromatic compound and a conjugated diene compound, and the vinylaromatic compound is selected from the group consisting of styrene, vinylxylene, vinylnaphthalene, α-methylstyrene, vinyltoluene and mixtures thereof, and said conjugated diene is selected from the group consisting of butadiene, isoprene, 1,3-pentadiene, 2,3-dimethylbutadiene and mixtures thereof.

14. The polyamide resin composition according to claim 1, wherein said impact resistance improvement material comprises a block copolymer which contains 0.01 to 1 mole % of acid groups and is obtained from a vinylaromatic compound and a conjugated diene compound and wherein the block copolymer is selected from the group consisting of a styrene-butadiene block copolymer, a styrene-isoprene-styrene-block copolymer, a hydrogenated styrene-butadiene-styrene block copolymer and a hydrogenated styrene-isoprene-styrene block copolymer.

15. The polyamide resin composition according to claim 1, wherein said impact resistance improving material comprises a block copolymer which contains 0.01 to 1 mole % of acid groups and is obtained from a vinylaromatic compound and a conjugated diene compound and wherein the block copolymer comprises a copolymer having a block structure of a polymer (I) comprising aromatic compound units and a polymer (II) comprising conjugated diene compound units of the formula (I)-(II)-(I), wherein the polymers (I) are the same or different and the polymer (II) is in an amount of at least 60 mole %.

16. The polyamide resin composition according to claim 1, wherein the impact resistance improving materials comprise an olefin copolymer comprising 0.01 to 10 mole % of acid groups, said acid groups being introduced into the olefin copolymers by a radical generating agent selected from the group consisting of benzoylperoxide and t-butyl hydroperoxide, and maleic acid or acrylic acid are allowed to react during copolymerization.

17. The polyamide resin composition according to claim 1, further comprising
(D) a polyphenylene ether resin and wherein (C) is in an amount not more than 35 parts by weight per 100 parts by weight of (A) and (D).

18. The polyamide resin composition according to claim 17, wherein said polyphenylene either type resin is a polymer comprising the repeating units represented by the formula shown below:

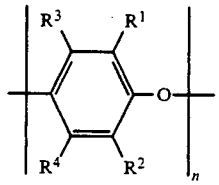

wherein $R^1$, $R^2$, $R^3$ and $R^4$ represent a residual groups of hydrogen, a halogen, an alkyl group and an aryl group, which may be the same or different, and n represents a polymerization degree.

19. The polyamide resin composition according to claim 17, wherein said polyphenylene either resin is at least one selected from the group consisting of poly(2,6-dimethylphenylene-1,4-ether), poly(2,6-diethylphenylene-1,4-ether), poly(2,6-dibromophenylene-1,4-ether), poly(2-methyl-6-ethylphenylene-1,4-ether), poly(2-chloro-6-methylphenylene-1,4-ether), poly(2-methyl-6-isopropylphenylene-1,4-ether), poly(2,6-di-n-propylphenylene-1,4-ether), poly(2-chloro-6-bromophenylene-1,4-ether), poly(2-chloro-6-ethylphenylene-1,4-ether), poly(2-methylphenylene-1,4-ether), poly(2-chlorophenylene-1,4-ether), poly(2-methyl-6-phenylphenylene-1,4-ether), poly(2-bromo-6-phenylphenylene-1,4-ether), poly(2,4'-methylphenylphenylene-1,4-ether) and poly(2,3,6-trimethylphenylene-1,4-ether) and copolymers of these.

20. The polyamide resin composition according to claim 17, wherein the amount ratios of the component (A) and the component (D) are 30 to 80% by weight of the component (A) and 70 to 20% by weight of the component (D).

21. The polyamide resin composition according to claim 17, wherein said polyphenylene ether resin is modified by incorporating a compound having a functional group reactive with a polyamide internally into said polyphenylene ether type resin or graft polymerizing onto said polyphenylene either type resin a modifier selected from the group consisting of an unsaturated carboxylic acid, a derivative of an unsaturated carboxylic acid and an unsaturated imide compound or heating and melting a polyethylene ether type resin and said modifier with a peroxide at 250° to 350° C., wherein said unsaturated carboxylic acid or derivatives thereof are selected from the group consisting of acrylic acid, methacrylic acid, maleic acid, itaconic acid, fumaric acid and mixtures thereof and the unsaturated imide compound is selected from the group consisting of N-methylmaleimide, N-ethylmaleimide, N-propylmaleimide, N-butylmaleimide, N-octylmaleimide, N-phenylmaleimide, N-(o-methylphenyl)-maleimide, N-(m-methylphenyl)maleimide, N-(p-methylphenyl)maleimide, N-(methoxyphenyl)maleimide, N-(chlorophenyl)maleimide, N-(carboxyphenyl)maleimide, N-benzylmaleimide, N-naphthylmaleimide, N-cyclohexylmaleimide, itaconimide, N-methylitaconimide, N-phenylitaconimide, and mixtures thereof, wherein said modifier is in an amount of 0.01 to 10% by weight based on the weight of the polyphenylene ether type resin, and wherein said peroxide is selected from the group consisting of benzoylperoxide and α-, α-bis-t-butyl-peroxy-p-diisopropylbenzene.

22. The polyamide resin composition according to claim 17, wherein said polyamide resin is selected from the group consisting of polymers and copolymers obtained from ε-caprolactam, 6-aminocaproic acid, ε-enatholactam, 7-aminoheptanoic acid, 11-aminoundecanoic acid, 9-aminoanoic acid, α-pyrrolidone, or α-piperidone; and polymers and copolymers obtained by polycondensation of a diamine selected from the group consisting of hexamethylenediamine, nonamethylenediamine, undecamethylenediamine, dodecamethylenediamine and metaxylylenediamine with an acid selected from the group consisting of terephthalic acid, isophthalic acid, adipic acid and sebacic acid; and blends thereof; and said polyphenylene ether resin is selected from the group consisting of poly(2,6-dimethylphenylene-1,4-ether), poly(2,6-diethylphenylene-1,4-ether), poly(2,6-dibromophenylene-1,4-ether), poly(2-methyl-6-ethylphenylene-1,4-ether), poly(2-chloro-6-methylphenylene-1,4-ether), poly(2-methyl-6-isopropylphenyl-1,4-ether), poly(2,6-di-n-propylphenylene-1,4-ether), poly(2-chloro-6-bromophenylene-1,4-ether), poly(2-chloro-6-ethylphenylene-1,4-ether), poly(2-methylphenylene-1,4-ether), poly(2-chlorophenylene-1,4-ether), poly(2-methylphenylene-1,4-ether), poly(2-chlorophenylene-1,4-ether), poly(2-methyl-6-phenyphenylene-1,4-ether), poly(2-bromo-6-phenylphenylene-1,4-ether), poly(2,4'-methylphenylphenylene-1,4-ether), poly(2,3,6-trimethylphenylene-1,4-ether) and copolymers thereof.

* * * * *